United States Patent [19]

Okumiya et al.

[11] 4,053,321
[45] Oct. 11, 1977

[54] HEAT FUSED REFRACTORY PRODUCT CONTAINING ZIRCONIA HAVING HIGH CORROSION RESISTANCE

[75] Inventors: Masataro Okumiya, Chigasaki; Takuro Ono, Yokohama, both of Japan

[73] Assignee: Asahi Glass Company Ltd., Tokyo, Japan

[21] Appl. No.: 718,575

[22] Filed: Aug. 30, 1976

[30] Foreign Application Priority Data

Sept. 30, 1975 Japan .................................. 50-117160

[51] Int. Cl.$^2$ ............................................. C04B 35/48
[52] U.S. Cl. ...................................................... 106/57
[58] Field of Search ............................................ 106/57

[56] References Cited

U.S. PATENT DOCUMENTS 3,837,870  9/1974  Recasens et al. ..................... 106/57

Primary Examiner—J. Poer
Attorney, Agent, or Firm—Oblon, Fisher, Spivak, McClelland & Maier

[57] ABSTRACT

A $ZrO_2$-$Al_2O_3$-$SiO_2$ type heat fused refractory product comprises 40 to 70 wt.% of $ZrO_2$ + $SnO_2$; 10 to 58 wt.% of $Al_2O_3$ + $Cr_2O_3$ and 2 to 20 wt.% of $SiO_2$ wherein the content of alkali metal oxide is less than that of $SiO_2$; the content of $SnO_2$ is more than that of $SiO_2$; and the content of $ZrO_2$ is more than that of $SnO_2$. The heat fused refractory product containing zirconia has excellent corrosion resistance and low expansion characteristics.

9 Claims, No Drawings

HEAT FUSED REFRACTORY PRODUCT CONTAINING ZIRCONIA HAVING HIGH CORROSION RESISTANCE

BACKGROUND OF THE INVENTION

The present invention relates to the improvement of a heat fused refractory product containing zirconia. More particularly, it relates to a refractory product having higher corrosion resistance.

The heat fused refractory products are different from the burned or unburned bonded refractory products in structure and in the manufacture thereof, and have been known as high quality refractory products which have excellent corrosion resistance, abrasion resistance and compressive strength. The heat fused refractory products are cast refractory products obtained by heat-fusing desired refractory materials by an electric furnace, pouring the fused composition into a mold and resolidifying it while annealing it.

Sometimes, the fused composition is annealed in an electric furnace to resolidify it.

The present invention will be illustrated by the former embodiment. The $ZrO_2$-$Al_2O_3$-$SiO_2$ type fused-cast refractory products containing a $ZrO_2$ component have been widely used because the products are especially useful as the glass furnace materials.

The conventional $ZrO_2$-$Al_2O_3$-$SiO_2$ type refractory products usually had $ZrO_2$ contents of 30 to 35 wt.% and a maximum of about 41 wt.%.

The conditions for operating molten glass vessels and furnaces have been severe whereby higher resistances of the refractory products used in the operation have been required.

The refractory products containing higher contents of $ZrO_2$ have been expected to provide refractory products having higher corrosion resistance. Even though such a demand exists found, a heat fused-cast refractory product containing high content of $ZrO_2$ has not been attained because such a $ZrO_2$ component causes significant expansion and contraction due to modifications caused by the monoclinic system ⇌ tetragonal system transition at about 1000° to 1100° C.

On the other hand cast refractory products having high contents of $ZrO_2$ such as 40 to 55 wt.% of $ZrO_2$ content have been proposed. Some products have been used in some applications.

However, in order to prevent said abnormal expansion and contraction of the product without deterioration of the corrosion resistance of the product having high $ZrO_2$ content, the components for forming a matrix should be quite limited. The product having more than 43 wt.% of $ZrO_2$ content has scarcely rarely been used.

On the other hand, it has been known to add CaO, MgO or $Y_2O_3$ as a method of decreasing the abnormal expansion and contraction of $ZrO_2$ component, that is, a method of stabilizing the $ZrO_2$ component.

However, the method has not been effective for the heat fused refractory products.

The inventors have succeeded to provide a heat fused-cast refractory product wherein the abnormal expansion and contraction of $ZrO_2$ component can be inhibited though the $ZrO_2$ content is high and high corrosion resistance is imparted it is capable of being used in severe conditons though the $ZrO_2$ content is in the conventional range.

SUMMARY OF THE INVENTION

It is an object of the invention to provide a $ZrO_2$-$Al_2O_3$-$SiO_2$ type heat fused-cast refractory product wherein the abnormal expansion and contraction of the $ZrO_2$ component is not increased and is inhibited though the $ZrO_2$ content is increased for improving the corrosion resistance.

It is another object of the invention to provide a $ZrO_2$-$Al_2O_3$-$SiO_2$ type heat fused-cast refractory product having excellent corrosion resistance without increasing this $ZrO_2$ content to higher level and wherein the abnormal expansion and contraction of the $ZrO_2$ component is inhibited.

It is still another object of the invention to provide a heat fused-cast refractory product which does not crack though it has high corrosion resistance.

The objects of the present invention have been attained by providing a $ZrO_2$-$Al_2O_3$-$SiO_2$ type heat fused refractory product containing zirconia which has high corrosion resistance, which comprises 40 to 70 wt.% of $ZrO_2$ + $SnO_2$; 10 to 58 wt.% of $Al_2O_3$ + $Cr_2O_3$ and 2 to 20 wt.% of $SiO_2$ wherein the content of alkali metal oxide is less than that of $SiO_2$ and the content of $SnO_2$ is more than that of $SiO_2$ and the content of $ZrO_2$ is more than that of $SnO_2$.

DETAILED DESCRIPTION OF THE PREFERRED EMBODIMENTS

The $ZrO_2$-$Al_2O_3$-$SiO_2$ type heat fused refractory product is the base of the present invention.

The contents of the three main components of $ZrO_2$, $Al_2O_3$ and $SiO_2$ in the product are 40 to 70 wt.% of $ZrO_2$ + $SnO_2$; 10 to 58 wt.% of $Al_2O_3$ + $Cr_2O_3$ and 2 to 20 wt.% of $SiO_2$.

The reasons for the limitatons are as follows.

1. When the content $ZrO_2$ + $SnO_2$ is less than the range, corrosion resistance superior to that of the conventional $ZrO_2$-$Al_2O_3$-$SiO_2$ type product cannot be attained, whereas when the content of $ZrO_2$ + $SnO_2$ is more than the range, and the refractory product is used as a molten glass vessel, the tendency for forming sand in the glass product is increased. Moreover, the melting point is quite high and it becomes difficult to fuse the refractory product.

2. When the content of $Al_2O_3$ 30 $Cr_2O_3$ is less than the range, it is hard to obtain a cast mass having a crystalline microstructure which is preferable for imparting high thermal shock resistance, and the tendency for forming sand in the glass product is increased. When the content of $Al_2O_3$ + $Cr_2O_3$ is more than the range, the advantage of high corrosion resistance is disadvantageously decreased.

3. When the content of $SiO_2$ is less than the range, cracks are easily caused in the industrial preparation of the refractory product. When the content of $SiO_2$ is more than 2 wt.%, the inhibition of expansion is good though the $SnO_2$ content is small. When the content of $SiO_2$ is more than the range, the characteristics as a refractory product having high content of $ZrO_2$ + $SnO_2$ are unfavorable because of inferior resistance to corrosion.

The refractory product of the invention preferably comprises 50 to 62 wt.% of $ZrO_2$ + $SnO_2$; 30 to 45 wt.% of $Al_2O_3$ + $Cr_2O_3$ and 2 to 8 wt.% of $SiO_2$. In the refractory product of the invention, it is necessary to limit the contents of the main components as follows.

The content of $SnO_2$ should be more than that of $SiO_2$. When the content of $SnO_2$ is less than that of $SiO_2$, the $SnO_2$ component forms a glass component with $SiO_2$ whereby the $SnO_2$ does not contribute to inhibiting the abnormal expansion of the $ZrO_2$ component and a refractory product having high corrosion resistance can not be obtained.

The content of $ZrO_2$ should be more than that of $SnO_2$. When the content of $ZrO_2$ is less that of $SnO_2$, the refractory product is expensive though the corrosion resistance is not improved. The corrosion resistance is higher when the content of $ZrO_2$ is higher.

The ratio of $ZrO_2$ to $SnO_2$ is dependent upon the content of $SiO_2$ and usually is preferably 100 wt. parts of $ZrO_2$ to 5 to 30 wt. parts of $SnO_2$. $Al_2O_3$ can be used alone as the $Al_2O_3$ + $Cr_2O_3$ component to form the refractory product of the invention.

A part of the $Al_2O_3$ can be substituted with $Cr_2O_3$ whereby a refractory product having higher corrosion resistance than that of the $Cr_2O_3$ free composition can often be obtained.

However, when the content of $Cr_2O_3$ is more than that of $Al_2O_3$, the cost of the refractory product is high though the improvement of corrosion resistance is not great, and the effect of $SnO_2$ in inhibiting the abnormal expansion of the cast product is sometimes lost.

Accordingly, it is preferable that the content of $Al_2O_3$ be more than that of $Cr_2O_3$.

Alkali metal oxides especially $Na_2O$ are easily incorporated from the raw materials.

When the content of the alkali metal oxide is too high, the corrosion resistance of the refractory product is inferior.

When the content of the alkali metal oxide is more than that of $SiO_2$, the effect for inhibiting the abnormal expansion is decreased.

Accordingly, the content of the alkali metal oxide should be less than that of $SiO_2$ and is preferably less than 0.5 times especially less than 0.25 times, that $SiO_2$.

On the other hand, a small content such as 0.2 to 3 wt.% of the alkali metal oxide is effective for inhibiting the crystallization of the glass matrix part of the refractory product.

When a large cast refractory product such as the throat of a molten glass furnace is prepared, the cast mass is annealed in a mold and the matrix part of the cast mass is easily crystallized.

Accordingly, the incorporation of a small content of the alkali metal oxide is effective for preparing a large cast refractory product.

The refractory product of the invention comprises said main components. Also, it is possible to incorporate the other components as far as the characteristics of the refractory product are not deteriorated. When a large amount of an alkaline earth metal oxide, $Fe_2O_3$, $TiO_2$ or $B_2O_3$ is incorporated, the corrosion resistance is inferior. However, it is possible to incorporate less than 4 wt.% of these components, and it is preferable to add less than 2 wt.%, especially less than 1 wt.% of these components.

The total content of $ZrO_2$ + $SnO_2$ + $Al_2O_3$ + $Cr_2O_3$ + $SiO_2$ + $Na_2O$ in a heat fused-cast refractory product of the invention is usually more than 96 wt.%, preferably more than 98 wt.%, especially more than 99 wt.%. The compositions of the refractory products of the invention have been disclosed above.

From the viewpoint of the crystalline microstructure, the refractory product comprises crystals of baddeleyite and corundum (and chromium oxide) in interlocking relationship filled with glass matrix in the spaces between the crystals.

In many cases a part of the $SnO_2$ forms a solid solution with $ZrO_2$ (it is considered that the abnormal expansion of the $ZrO_2$ component is inhibited by the solid solution), and another part of the $SnO_2$ is combined with $SiO_2$ to form the matrix.

The refractory product has said structure and the baddeleyite ($ZrO_2$) crystals form a monoclinic system; however, the abnormal expansion is inhibited probably by the effect of solid solution of a $ZrO_2$ with $SnO_2$ whereby a cast refractory product containing high content of $ZrO_2$ can be obtained.

Although the content of $ZrO_2$ is high, the abnormal expansion and contraction caused by the $ZrO_2$ component can be minimized and the corrosion resistance is excellent. The cast refractory products can be used for molten glass vessels and molten metal furnaces and other products and the industrial value of the refractory products is remarkably high. The refractory product of the invention can be crushed and used an aggregate for bonded refractory products. The refractory products in the aggregate form are also included in the invention.

The invention will be further illustrated by certain examples.

EXAMPLE

The following raw materials were used for preparing the samples.

| | | |
|---|---|---|
| $ZrO_2$ sources: | | |
| Baddeleyite mineral: | | |
| | $ZrO_2$: | 98 wt.%; |
| | $SiO_2$: | less than 0.5 wt.%; |
| | $Fe_2O_3$: | less than 0.8 wt.%; |
| | $TiO_2$: | less than 0.7 wt.%; |
| | MgO: | less than 0.1 wt.%; |
| | CaO: | less than 0.1 wt.%; |
| Zircon: | | |
| | $ZrO_2$: | 66 wt.%; |
| | $SiO_2$: | 33 wt.%; |
| | $Al_2O_3$: | less than 1 wt.%; |
| | $Fe_2O_3$: | less than 1 wt.%. |
| Zircon: (reduced in silica content) | | |
| | $ZrO_2$: | 87 wt.%; |
| | $SiO_2$: | 12 wt.%; |
| | $Fe_2O_3$: | less than 0.1 wt.%; |
| | $TiO_2$: | less than 0.2 wt.%. |
| $SiO_2$ sources: | | |
| | Zircon: | (stated above) |
| | Silica stone: | |
| | $SiO_2$: | 99 wt.%; |
| | $Al_2O_3$: | 0.3 wt.%; |
| | $Fe_2O_3$: | 0.1 wt.%; |
| | CaO: | 0.1 wt.%; |
| | MgO: | 0.1 wt.%; |
| | $TiO_2$: | less than 0.1 wt.%. |
| $SnO_2$ source: | | |
| | Stannic oxide: | |
| | $SnO_2$: | more than 99 wt.% |
| $Al_2O_3$ source: | | |
| | Bayer-alumina: | |
| | $Al_2O_3$ | 99 wt.%; |
| | NaO: | 0.5 wt.%; |
| | $SiO_2$: | less than 0.1 wt.%. |
| $Cr_2O_3$ source: | | |
| | Chromium oxide: | |
| | $Cr_2O_3$: | morethan 99 wt.%. |
| $Na_2O$ source. | | |
| | Soda ash: | |
| | $Na_2O$: | 50 wt.% |
| | Ignition loss: | 50 wt.%. |

Each batch of raw materials was prepared by mixing at the ratios for the contents shown in Table 1 and the batch was completely heat-fused in an arc electric furnace and then the fused batch was poured into a mold made of graphite (inner size of 110 × 65 × 450 mm) to cast it.

The cast samples Nos. 1 to 3; Nos. 10 to 12; Nos. 21 to 28 and Nos. 33 to 34 (* symbol) are shown as references and are not the samples of the invention.

Table 1

| Sample No. | Chemical Composition (wt.%) | | | | | | |
|---|---|---|---|---|---|---|---|
| | $Al_2O_3$ | $ZrO_2$ | $SnO_2$ | $SiO_2$ | $Na_2O$ | $Cr_2O_3$ | $Fe_2O_3$ $TiO_2$ MgO |
| *1 | 49.5 | 33.1 | — | 16.0 | 1.1 | — | less than 0.2 as total |
| *2 | 46.1 | 41.3 | — | 11.7 | 0.7 | — | " |
| *3 | 31.6 | 57.1 | — | 10.2 | 0.6 | — | " |
| 4 | 41.4 | 23 | 19.3 | 15.1 | — | — | " |
| 5 | 39.3 | 34 | 16 | 10.1 | 0.3 | — | " |
| 6 | 40.8 | 41.9 | 12 | 5.0 | — | — | " |
| 7 | 43.6 | 48.3 | 4.5 | 3.0 | 0.4 | — | " |
| 8 | 39.2 | 54.1 | 3.6 | 3.0 | — | — | " |
| 9 | 30.7 | 62.5 | 3.5 | 3.1 | — | — | " |
| *10 | 46.3 | 19.5 | 25.0 | 8.0 | 0.9 | — | " |
| *11 | 53.6 | 25.2 | 10.3 | 10.0 | 0.5 | — | " |
| *12 | 21.3 | 61.5 | 13.0 | 4.0 | — | — | " |
| 13 | 26.0 | 34.0 | 12.9 | 8.1 | — | 21.0 | " |
| 14 | 35.2 | 38.5 | 7.0 | 3.0 | 0.3 | 15.9 | " |
| 15 | 30.2 | 45.1 | 15.1 | 3.0 | 0.2 | 5.1 | " |
| 16 | 5.1 | 45.6 | 10.2 | 8.3 | — | 30.7 | " |
| 17 | 20.0 | 36.9 | 10.0 | 8.1 | — | 24.8 | " |
| 18 | 45.6 | 42.2 | 9.0 | 2.5 | 0.5 | — | " |
| 19 | 46.2 | 45.0 | 5.1 | 3.0 | 0.5 | — | " |
| 20 | 40.2 | 45.5 | 8.2 | 6.0 | — | — | " |
| *21 | 37.2 | 35.0 | 10.0 | 17.5 | — | — | " |
| *22 | 44.6 | 45.0 | 10.0 | 0.5 | — | — | " |
| *23 | 43.2 | 45.1 | 10.0 | 1.5 | — | — | " |
| *24 | 20.7 | 45.1 | 10.1 | 23.0 | 0.8 | — | " |
| *25 | 35.1 | 42.9 | 9.9 | 7.2 | — | — | 4.8 (mostly $Fe_2O_3$) |
| *26 | 31.9 | 45.0 | 10.0 | 12.3 | 0.6 | — | less than 0.2 as total |
| *27 | 35.8 | 50.2 | 5.2 | 8.6 | — | — | " |
| *28 | 38.6 | 45.1 | 3.9 | 12.1 | — | — | " |
| 29 | 38.5 | 45.2 | 9.9 | 5.9 | 0.3 | — | " |
| 30 | 38.9 | 44.8 | 10.2 | 5.2 | 0.8 | — | " |
| 31 | 37.0 | 44.7 | 10.0 | 6.0 | 2.1 | — | " |
| 32 | 32.9 | 45.3 | 9.6 | 6.9 | 5.1 | — | " |
| *33 | 31.5 | 45.2 | 10.2 | 5.8 | 7.1 | — | " |
| *34 | 49.5 | 33.1 | 8.0 | 3.9 | 5.4 | — | " |

The characteristics of the samples are shown in Table 2.

Table 2

| Sample No. | Corrosion resistance (note 1) | Abnormal expansion difference (note 2) | Formation of sand (note 3) | Formation of crackings (note 4) |
|---|---|---|---|---|
| *1 | 61 | 0.3 | none | none |
| *2 | 69 | 0.35 | none | none |
| *3 | 73 | 0.7 | many | many |
| 4 | 90 | 0.08 | few | none |
| 5 | 88 | 0.1 | none | none |
| 6 | 96 | 0.15 | none | none |
| 7 | 95 | 0.1 | none | none |
| 8 | 85 | 0.15 | none | none |
| 9 | 93 | 0.15 | none | none |
| *10 | 72 | 0.07 | none | none |
| *11 | 56 | 0.15 | none | none |
| *12 | 89 | 0.1 | many | — |
| 13 | 82 | 0.1 | none | none |
| 14 | 83 | 0.1 | none | none |
| 15 | 89 | 0.08 | none | none |
| 16 | 96 | 0.2 | few | few |
| 17 | 94 | 0.15 | few | none |
| 18 | 95 | 0.02 | none | few |
| 19 | 87 | 0.04 | none | none |
| 20 | 93 | 0.15 | none | — |
| *21 | 79 | 0.18 | few | — |
| *22 | 98 | 0.07 | many | many |
| *23 | 95 | 0.07 | many | many |
| *24 | 62 | 0.2 | none | none |
| *25 | 70 | 0.3 | none | none |
| *26 | 83 | 0.2 | many | many |
| *27 | 87 | 0.3 | few | many |
| *28 | 72 | 0.5 | few | many |
| 29 | 90 | 0.05 | none | none |
| 30 | 94 | 0.08 | none | — |
| 31 | 95 | 0.1 | none | none |
| 32 | 82 | 0.15 | few | none |
| *33 | 71 | 0.3 | few | none |
| *34 | 64 | 0.2 | few | none |

Note 1:
10 mm of the end of each test sample having a diameter (a) of 13 mm and a length of 45 mm was immersed in a molten glass (soda-lime glass) in a platinum crucible at 1500° C for 30 hours.

The sample was removed and the diameter (b) of the part of the sample corroded to the greatest degree was measured and the percent corrosion was given by the equation $$\frac{a-b}{a} \times 100 \ (\%)$$

wherein a designates the diameter of the sample before the corrosion. The corrosion resistance was given by the equation of 100 - percent corrosion.

Note 2:
The abnormal expansion difference was given by the difference between the local maximum value and the local minimum value in the thermal expansion curve (temperature vs thermal expansion) (%).

Note 3:
The formation of sand was determined by observing the amount of sand with a microscope in the glass adhered to the test sample and remaining in the platinum crucible.

Note 4:

The formation of cracks was determined by observing the crackings formed on the cast mass.

The fused batch was casted in a mold made of graphite (thickness 6 cm: inner size of 6.5 × 11.5 × 45 cm), and after 5 minutes, the mold was removeed. The sample was annealed in Bayer-alumina powder for about 40 hours and the sample was removed at lower than 100° C and the cracks on the surface of the sample were observed.

The effects of the cast refractory products of the invention can be seen from the results shown in the Tables.

The important results will be explained.

Samples Nos. 1 and 2, are the conventional type products having the usual content and a high content of $ZrO_2$. In comparing the samples Nos. 1 and 2, with the samples Nos. 4 to 9, Nos. 13 to 20 and Nos. 29 to 32 which are products of the invention, the samples of the invention either have superior or the same corrosion resistance.

Sample No. 3 is not commercially available and has high content of $ZrO_2$ but has no $SnO_2$ component whereby the abnormal expansion difference was too large to use it practically.

The products of the invention having high content of $ZrO_2$ which contain the $SnO_2$ component have low abnormal expansion differences, and can be used in the practical use.

Sample No. 10 has a content of $SnO_2$ which is more than that of $ZrO_2$, whereby the corrosion resistance of the sample No. 10 is inferior of that of sample No. 4 having a content of $ZrO_2$ which is more than that of $SnO_2$. The cost of the sample No. 10 is higher than that of sample 4 and accordingly it is not suitable for practical use.

Sample No. 11 has less content of that of $ZrO_2$ + $SnO_2$ whereby the corrosion resistance was the same or inferior to the conventional samples, and it can not be used for the purposes of the invention.

Samples No. 12 has excess content of $ZrO_2$ + $SnO_2$ whereby formation of much sand in the molten glass is disadvantageously caused though the corrosion resistance is excellent.

Samples Nos. 6 to 9, Nos, 15 to 20 and Nos. 29 to 32 are products of the invention and have high content of $ZrO_2$. However, the products also have a suitable content of $SnO_2$ whereby the abnormal expansion found in the case of sample No. 3 as a reference is inhibited.

The results of the samples Nos. 13 to 15 demonstrate that a part of the $Al_2O_3$ can be substituted by $Cr_2O_3$ enabling practical use.

Samples Nos. 16 and 17 have the content of $Cr_2O_3$ which is more than that of $Al_2O_3$ whereby the effect for inhibiting the abnormal expansion is decreased. The $Cr_2O_3$ component is expensive in comparison with the $Al_2O_3$ component. Accordingly, it is not preferable to have a content of $Cr_2O_3$ which is more than that of $Al_2O_3$.

The results of the samples Nos. 18 to 20 and Nos. 4 to 9 show that the products which are suitable for practical use can be obtained when the content of $SiO_2$ is in the range of 2 to 20 wt.%.

Samples Nos. 18 to 20 had high corrosion resistance and also displayed the effect of inhibition of the abnormal expansion though the content of $SnO_2$ was relatively small.

Samples Nos. 22 and 23 have less content of $SiO_2$ whereby cracks were easily formed.

Sample No. 24 had excess content of $SiO_2$ whereby the desired corrosion resistance could not be attained though the content of $ZrO_2$ + $SnO_2$ was high enough. Accordingly, the sample Nos. 22 to 24 are not suitable for practical use.

Sample No. 25 had excess content of the impurities whereby the corrosion resistance was inferior.

Samples No. 21 and Nos. 26 to 28 had a content of $SiO_2$ which is more than that of $SnO_2$, whereby the effect of inhibition of the abnormal expansion due to the presence of $SnO_2$ was decreased.

In samples Nos. 29 to 34, the ratio of $Na_2O/SiO_2$ is varied. When the content of $SiO_2$ is more than that of $Na_2O$, (Samples Nos. 29 to 32), the excellent characteristics of the product of the invention were displayed.

However, when the content of $Na_2O$ was more than that of $SiO_2$, (Samples Nos. 32 to 33), the effect of inhibiting the abnormal expansion could not be satisfactorily obtained and the corrosion resistance was not satisfactory though the $SnO_2$ component was incorporated.

We claim:

1. A heat fused refractory product which comprises by weight: $ZrO_2$ + $SnO_2$: 40-70%; $Al_2O_3$ + $Cr_2O_3$: 10-58%; $SiO_2$: 2-20%; and from 0.2-3% of an alkali metal oxide; wherein the amount of alkali metal oxide is less than that of $SiO_2$; the amount of $SnO_2$ is more than that of $SiO_2$; the amount of $ZrO_2$ is more than that of $SnO_2$; and the amount of $Al_2O_3$ is more than that of $Cr_2O_3$.

2. The heat fused refractory product of claim 1 which comprises by weight $ZrO_2$ + $SnO_2$: 50 – 62%; $Al_2O_3$ + $Cr_2O_3$: 30 – 45%; and $SiO_2$: 2-8%.

3. The heat fused refractory product of claim 1, wherein the amount of $SnO_2$ is 5 – 30% of the amount of $ZrO_2$.

4. The heat fused refractory product of claim 1, wherein the amount of alkali metal oxide is less than one-half that of $SiO_2$.

5. The heat fused refractory product of claim 4, wherein the amount of alkali metal oxide is less than one-fourth that of $SiO_2$.

6. The heat fused refractory product of claim 1 having a structure which consists essentially of baddeleyite and corundum with a glass phase present interstitially between the baddeleyite and corundum crystalline phases; and wherein part of the $SnO_2$ forms a solid solution with $ZrO_2$ and part of the $SnO_2$ forms a glass phase with $SiO_2$.

7. The heat fused refractory product of claim 1, wherein the alkali metal oxide is $Na_2O$.

8. The heat fused refractory product of claim 2, wherein the sum of the amounts of $ZrO_2$, $SnO_2$, $Al_2O_3$, $Cr_2O_3$, $SiO_2$ and $Na_2O$ is, by weight, more than 96%.

9. The heat fused refractory product of claim 8, wherein the sum of the amounts of $ZrO_2$, $SnO_2$, $Al_2O_3$, $Cr_2O_3$, $SiO_2$ and $Na_2O$ is by weight, more than 98%.

* * * * *